(12) United States Patent
Almeida

(10) Patent No.: US 8,811,606 B2
(45) Date of Patent: Aug. 19, 2014

(54) ASYMMETRIC CRYPTOGRAPHY USING SHADOW NUMBERS

(75) Inventor: John Almeida, Richmond, CA (US)

(73) Assignee: UnoWeb Inc., Emeryville, CA (US)

( * ) Notice: Subject to any disclaimer, the term of this patent is extended or adjusted under 35 U.S.C. 154(b) by 934 days.

(21) Appl. No.: 12/903,542

(22) Filed: Oct. 13, 2010

(65) Prior Publication Data
US 2011/0026711 A1 Feb. 3, 2011

Related U.S. Application Data

(63) Continuation-in-part of application No. 11/738,446, filed on Apr. 20, 2007, now abandoned.

(51) Int. Cl.
*G06F 21/00* (2013.01)
(52) U.S. Cl.
USPC .............................. 380/28; 380/42
(58) Field of Classification Search
None
See application file for complete search history.

(56) References Cited

U.S. PATENT DOCUMENTS

| | | | |
|---|---|---|---|
| 5,301,235 A * | 4/1994 | Shimada | 380/42 |
| 2006/0101459 A1 * | 5/2006 | Crosier et al. | 717/174 |

FOREIGN PATENT DOCUMENTS

EP  0973293  * 7/1999

OTHER PUBLICATIONS

Schneier, Applied Cryptography, 1996, Wiley and Sons, pp. 4-6, 357-358, 466-468.*
Wang et al, Key Management Based on Ellipitic Curve Paillier Scheme in Ad Hoc Networks, 2007, pp. 116-119.*
Wang et al, FPGA Implementation of a Large-Number Multiplier for Fully Homomorphic Encryption, 2013, pp. 2589-2592.*

* cited by examiner

*Primary Examiner* — Luu Pham
*Assistant Examiner* — Brian Olion
(74) *Attorney, Agent, or Firm* — Louis Ventre, Jr.

(57) ABSTRACT

A method and an apparatus for enciphering and deciphering content with symmetric and asymmetric cryptography with the use of the shadow numbering system where two or more shadow values are used with two or more base values with a two side equation, on one side the value to encipher is multiplied with one of the shadow value then the modulus taken with the base value, to decipher the enciphered value is multiplied with the shadow value that didn't take part of the first equation then the modulus is taken with the base value, thus, deciphering the enciphered value.

7 Claims, 8 Drawing Sheets

US 8,811,606 B2

ASYMMETRIC CRYPTOGRAPHY USING SHADOW NUMBERS

CROSS-REFERENCE TO RELATED APPLICATIONS

This application is a continuation-in-part of U.S. application Ser. No. 11/738,446 filed 20 Apr. 2007, which is hereby incorporated by reference herein.

FIELD OF THE INVENTION

The field of this invention relates to asymmetric cryptography with the use of the shadow numbering system.

BACKGROUND ART

Through the ages mathematicians have been puzzled and thrilled; puzzled with the secret of numbers and thrilled with the infinite possibilities that the science of mathematics has to offer. From time to time, new ways of using numbers and new numbering system are discovered. Such discoveries reveal a new infinity of possibilities that can be mind boggling, since in mathematics or in any other science for that matter, everything is in the hidden to be discovered, analyzed and expanded.

In the field of encryption, new algorithms are found and used in the science of the ability to cipher and decipher information with the use of mathematical formulas and to some extent they all use the science of the shadow numbers. There are two schemes of encryption algorithm, symmetric (private) and asymmetric (public).

The symmetric scheme uses a single key called the private key and it is used both, to encrypt and decrypt. The private key must be kept private all the time that is, kept secret, since only one key is used and anyone in possession of it will be able to cipher (encrypt) and decipher (decrypt) the message that is associated with it.

The asymmetric scheme is when two keys are used, one for enciphering and the other for deciphering the content, there is, the public and the private encryption-keys pair. The public key as its name implies, it is to be used by anyone who comes across it and it works in conjunction with its equivalent private key. The public key is used for enciphering the content and the private key equivalent of the public key is used for deciphering the enciphered content.

An asymmetric scheme has advantages: it can be viewed as a two-way lane one for each direction, that is, the private key can be used for enciphering as well and the public key equivalent to the private key for deciphering what was enciphered with the private key. The private key can encipher content to a group of recipients and everyone in possession of the public key equivalent to the private key can decipher it. This process happens when the sender—holder of the private—sends a message to the group having the public key.

In general, the asymmetric scheme is slower than its symmetric counterpart. In a great number of situations, a combination of both schemes is used for the purpose of security and speed. The symmetric scheme is used to encipher the content and the asymmetric one is used to encipher the content's key. In this way, the best of the two worlds can be achieved. The symmetric scheme encrypts the content and produces the content's key and the asymmetric scheme encrypts the content's key.

The asymmetric scheme involves mathematical formulas and in most cases employs numerical exponentiations, which requires a great deal of computation power on both ends, for enciphering and deciphering. The asymmetric scheme works by providing two or more formulas for the creation of the two-key combination, for enciphering and deciphering. The two-key pair and the two keys as originating numbers, produce mathematical values equivalent to each other. These equivalents are considered the shadows of the originating numbers.

Hellman, et al., U.S. Pat. No. 4,200,770 (Hellman) teaches a cryptographic system that transmits a computationally secure cryptogram over an insecure communication channel without prearrangement of a cipher key. The conversers from transformations of exchanged transformed signals generate a secure cipher key. The conversers each possess a secret signal and exchange an initial transformation of the secret signal with the other converser. The received transformation of the other converser's secret signal is again transformed with the receiving converser's secret signal to generate a secure cipher key. The transformations use non-secret operations that are easily performed but extremely difficult to invert. It is infeasible for an eavesdropper to invert the initial transformation to obtain either converser's secret signal, or duplicate the latter transformation to obtain the secure cipher key.

Hellman teaches a cryptographic apparatus where two parties can safely exchange secured data through insecure channel without prior knowledge of the parties-common secret key. Hellman fails to teach, however, a common denominator in deriving the cryptographic keys without a laborious and expensive means for deriving the large-prime numbers values.

There are other means of encryption algorithm that include two keys: a private key and a public key. The intended recipient of the ciphered text that is, the encrypted text, only knows the public key by the private key equivalent. One of the most popular public key algorithms is the RSA algorithm, named after its three inventors—Ron Rivest, Adi Shamir, and Leonard Adleman. A message M is encrypted using the formula $C = M^E \bmod N$, where N is the product of two large primes numbers P. The exponent E is a number relatively prime to $(P-1)(Q-1)$. Q is chosen at random. The encrypted message C is deciphered using the formula $M = C^D \bmod N$ where $D = E-1 \bmod((p-1)(q-1))$. The exponent E and modulus N are used as the public key. The exponent D is the private key. The primes P and Q are not needed once the public and private keys have been computed but should remain secret.

SUMMARY OF INVENTION

A method and apparatus to encipher and decipher data using a shadow-numbering system where two equations are used with a common modulus value for two shadow numbers values. The value to encipher is multiplied with one of the shadow values, then a modulus is taken between the product and the shadow value. The resulting value of the modulus operation is an enciphered value. To decipher, the enciphered value is multiplied with the other shadow value. The modulus is taken with the base value. The result of the modulus operation is the deciphered value.

A modulus operation comprises a numeric value divided by another value and the remainder of the division operation is the modulus value. For instance, if a division operation having the dividend is '9' and the divisor is '4' then quotient is '2' and the remainder is '1.' The value of '1' is the modulus result value of a modulus operation between the value of '9' and the value of '4.' If the dividend value is smaller than the divisor value than the dividend value is the modulus result value. In another example, if the dividend value is '3' and the divisor value is '5' then the modulus value of a modulus operation between the value of '3' and the value of '5' is the modulus result value of '3.'

Any two values can be considered a pair of shadow values. Once two shadow values are multiplied and the value of one subtracted from the product, then the subtracted result is factored, with one of the factors comprising a shadows' base value for the pair of shadow values.

By adding the shadows' base value to each of the shadow values and raising all three values to a common power value (exponentially), one of the shadow values and the modulus of the raised shadows' base value are used for enciphering public key. The other shadow value with the modulus of the original base value are used for the deciphering private key. Multiplying a new value by the shadows' base values creates two new shadow values. Using one of the new shadow values along with the original base value (first raised base value), creates a new deciphering key for deciphering enciphered data with the private key. The second new shadow value along with the new base value is used for the private enciphering-key pair.

Each value participating in the creation of the base value will be a base, and each value participating in the creation of the shadow-pair will be a shadow-pair for each of the base. Values enciphered with one base can be deciphered with that base or with lower base values. The enciphering and deciphering values must be from one to the lowest base taking part of the enciphering and deciphering process minus one.

A method and an apparatus is disclosed for transmitting a key/password over insecure channel without the possibility of the deciphering of its content by an eavesdropper. A first signal containing the key/password to be transmitted is transposed with an additional random signal value and the intended signal along with the random signal is transmitted to the receiver and the receiver will transpose a second random signal and return to the sender the two random signals along with the intended signal's message. The sender removes the first random signal that was inserted by said sender apparatus and transmits the second random signal along with the intended signal's message. Upon receiving the two remaining signals the receiver removes the second random signal that as transposed by said receiver and the intended signal's message is retrieved.

Technical Problem

The RSA algorithm, disclosed in U.S. Pat. No. 4,405,829, and Hellman's algorithm fail to teach a simple means for deriving the cryptographic keys. Existing encryption techniques fail to teach an easy and inexpensive means for producing asymmetric cryptography that is easy and inexpensive to implement in software and hardware alike. Existing encryption techniques fails to teach a secure means where values other than prime numbers can be used in cryptographic process.

Advantageous Effects of Invention

The present invention teaches an asymmetric scheme of cryptography in both a method and apparatus. Encryption products are derived from the same base algorithm without requiring sophisticated and expensive means for encryption implementation and use.

This asymmetric scheme offers the best of the best in security and speed in a single algorithm. It is enabled by the shadow numbering system disclosed herein.

An easy and inexpensive computer device and method are disclosed for producing asymmetric encryption without the complexity that is currently available making exclusive use of prime numbers and exponentiation. This method and computer device may also be used for symmetric encryption.

A simple solution is disclosed for encryption and decryption. The encryption solution uses multiplication once, thus, providing a secure, uncomplicated and inexpensive solution. The use of a single algorithm for all cryptographic needs on hardware and software delivers encryption and decryption at relatively low cost and high speed.

BRIEF DESCRIPTION OF THE DRAWINGS

The accompanying drawings, which are incorporated in the form a part of this specification, illustrate embodiments of the invention and, together with the description, serve to explain the principles of the invention.

DESCRIPTION OF THE PREFERRED EMBODIMENTS

Figure 1:
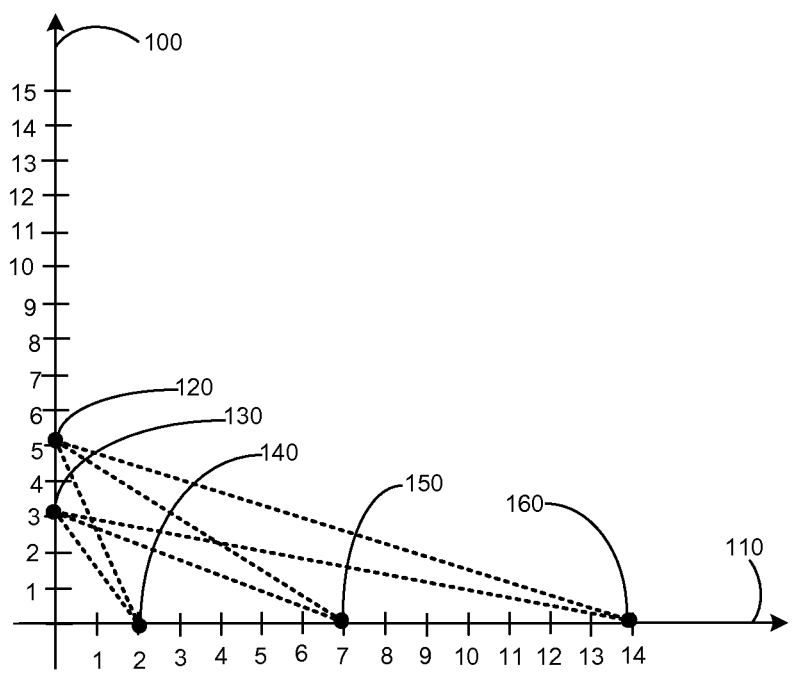
FIG. 1 illustrates the shadow axis having two shadow values and the base axis having three base values related to the two shadow values.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method or a computer program product. Accordingly, the present invention may take a form of an entirely software embodiment on non-transitory computer memory, or an embodiment combining software and hardware. Furthermore, the present invention may take the form of a computer program product on a non-transitory computer-readable storage medium having computer-readable program code means embodied in such medium. Any non-transitory computer readable medium may be utilized, including but not limited to: hard disks, CD-ROMs, optical storage devices, magnetic devices, etc.

Any reference to names of a product or of a company is for the purpose of clarifying the disclosure. Such references may be registered to their respective owners.

Encryption with Shadow Numbers

Whenever two numbers are multiplied and "1" is subtracted from their product then the result divided by any factor that it is dividable with to produce a whole number base, the shadow-triplet can then be derived taking the modulus of the two original numbers using that whole number base, the whole number base is also referred to as the shadow's base value. This is best explained with an example.

Example 1

This process step-by-step is:
picking two numbers: 5 and 3;
multiplying them: 5×3=15;
subtracting 1 from the product: 15−1=14; and
dividing the result by any factor: 14/2=7.
The shadow triplet comprises values of:
5 mod 7;
3 mod 7; and
7,
where 5 and 3 are the shadow values and 7 is the shadows' base value.

Using each of the first two values of the above shadow triplet, the next step is multiplying each of these two values by a number starting with the number one and sequentially advancing up to the shadow's base value minus one, which is 7−1=6 from the preceding example. This produces six products for each of these values.

The next step is determining the starting value by taking the modulus with the shadows' base value from one side of the equation to the other and performing the same operation. This is best illustrated with an example.

Example 2

1×5 mod 7=5=>5×3 mod 7=1—the reverse is true as well—1×3 mod 7=3=>3×5 mod 7=1.
2×5 mod 7=3=>3×3 mod 7=2—the reverse is true as well—2×3 mod 7=6=>6×5 mod 7=2.
3×5 mod 7=1=>1×3 mod 7=3—the reverse is true as well—3×3 mod 7=2=>2×5 mod 7=3.
4×5 mod 7=6=>6×3 mod 7=4—the reverse is true as well—4×3 mod 7=5=>5×5 mod 7=4.
5×5 mod 7=4=>4×3 mod 7=5—the reverse is true as well—5×3 mod 7=1=>1×5 mod 7=5.
6×5 mod 7=2=>2×3 mod 7=6—the reverse is true as well—6×3 mod 7=4=>4×5 mod 7=6.

Based on the above example, the 5 mod 7 is a shadow of 3 mod 7 and vice versa, 3 mod 7 is a shadow of 5 mod 7.

Thus, this method may be employed by a Computer for Enciphering/Deciphering Data (CEDD) (1000); a computer-readable medium (1008) capable of non-transitory data storage and configured to be accessible by the computer (1008); and, computer-readable instruction codes (1022) stored on the computer-readable medium (1008) and operable on the computer for enciphering/deciphering data (1000) to implement a method comprising the steps of: selecting a first shadow value and a second shadow value (1105, 1135); calculating shadows' base values by multiplying the first shadow value by the second shadow value then subtracting 1 to yield a first shadows' base value (1050); factoring the first shadows base value to yield a second shadows' base value and a third shadows' base value (1050); choosing a selected-shadows base value from one of the first shadows' base value (1050); the second shadows' base value (1050); and the third shadows' base value (1050); reading data to encipher wherein that the data to encipher is in the form of a numerical value from '1' to the selected shadows' base value minus '1' (1102); and, multiplying the numerical value with the first shadow value to obtain a product value (1106); and taking a modulus between the product value and the base value to obtain the enciphered value (1112).

This method is implemented on a computer for enciphering/deciphering data (1000), also referred to as a first computer, operating a first computer program (1022) for enciphering data comprising the steps of: selecting a first shadow value (1105), a second shadow value (1135) and a base value (1112); reading data to encipher (1102) wherein that the data to encipher (1102) is in the form of a numerical value (1102) from '1' to the base value minus '1'; multiplying the numerical value (1106) with the first shadow value (1105) to obtain a product value (1106); taking the modulus of the product value (1112) with the base value (1112) and the result from the modulus operation is the enciphered value (1114); and sending the enciphered value (1026) to a user (1052, 1054) for display on a second computer for enciphering/deciphering data (1036, 1028), said second computer for enciphering/deciphering data (1036, 1028) operated by the user (1052, 1054).

The above example used one of the factors of the product of two shadow values minus 1 to equal the shadows' base value, then derived the remaining two shadow-triplet values. The two shadow values in the example (3 and 5) are coincidentally prime numbers, which is not a requirement; they can be any number combination. Prime numbers, also referred to as "Primes," are best since they produce single base values, although any value will be sufficient. If the product of two shadow values minus 1 equals 21, then the value of 21 has 7 and 3. One of these may be selected as the shadows' base value because 21 has factors comprising the primes 3 and 7.

The above triplet has a major flaw since the two shadows are smaller than the base and this will have a very limited use in the science of cryptography. This flaw can be remedied by adding the base value to the other two shadow values. Such addition preserves a linear relation of the shadow to the base. An example illustrates this remedy. Since 7 is the base value illustrated above, the remedy is implemented by determining new values for the two shadow values: adding "7" to "5" equals "12" and adding "7" to "3" equals "10." Thus, 12 and 10 are the new shadow values.

Example 4

The following example repeats the methodology shown in Example 3 with the new shadow values:
1×12 mod 7=5=>5×10 mod 7=1—the reverse is true as well—1×10 mod 7=3=>3×12 mod 7=1.
2×12 mod 7=3=>3×10 mod 7=2—the reverse is true as well—2×10 mod 7=6=>6×12 mod 7=2.
3×12 mod 7=1=>1×10 mod 7=3—the reverse is true as well—3×10 mod 7=2=>2×12 mod 7=3.

4×12 mod 7=6=>6×10 mod 7=4—the reverse is true as well—4×10 mod 7=5=>5×12 mod 7=4.

5×12 mod 7=4=>4×10 mod 7=5—the reverse is true as well—5×10 mod 7=1=>1×12 mod 7=5.

6×12 mod 7=2=>2×10 mod 7=6—the reverse is true as well—6×10 mod 7=4=>4×12 mod 7=6.

Shadow Numbers: the Soul of Encryption

Private Key—The interesting thing with the shadow number is that it enables simplified calculations. Because of their simplicity, a rapid process of calculation is enabled. The above example could be used for a simple encryption. Security is another matter that will be addressed shortly.

The above process may be used in conjunction with other encryption schemes to increase security. For instance, if used with Diffie-Hellman for the common key exchange, then having two common keys exchanged and if any of them happen to be even number, have one added to, thus converting to an odd number. Next, by applying the same method aforementioned and have the shadow-triplet numbers created, finally, have them as the encryption mechanism for transferring cipher data.

The advantage of such a combination is speed and since the shadow triplet will be totally hidden from an eavesdropper, its security will lie in the difficulty deriving the three vales instead of just one. Shadow-number triplet can be used as any other numbering system; they can be multiplied, raised to their powers, added to and subtracted from, as well.

The shadow triplets can be raised to the power of another value to produce larger and safer values. For example, raising the first two values of the shadow triplet of the last example above to the power of 3: 12^3 mod 7^3=>1728 mod 343 and 10^3 mod 7=>(1000)mod 7. The "^" key after a value indicates raising the value to the power of the value following the "^" key. This last schema can be used as a asymmetric encryption, the encryption key is: 1728 mod 343 and the decryption key is: (1000)mod 7; the reverse can be true as well and the encryption key can be: (1000)mod 343 and de decryption key can be: 1728 mod 7, either way will work. The last arrangement will offer more security since anyone using brute force attack will need to start from the known shadow value, which is from the lowest to the highest value.

Once again, in our examples we're using small values. In practice, much larger values having hundreds of positions are preferably used for all the triplet values. The base value determines the magnitude of the values to cipher, which in all three examples, the values to cipher will be from "1" to "6." The value of "0" cannot be used in the ciphering and there is a solution for such: adding the value of "1" for each value to be enciphered and have "1" subtracted from the deciphered values. This will yield the original values.

This schema can be called one way encryption since the enciphering only happens from the sender to the receiver and in a lot of cases the sender and receiver can exchange their respective public keys and have a safe two-way communication, it can be used instead of, or be a replacement for Diffie-Hellman algorithm.

Most of the time security involves more than just two individuals and a more elaborate means for enciphering and deciphering content in a two-way multiparty environment is required. This requires a more sophisticated enciphering schema, which the aforementioned private schema lacks.

Public Key—Once explaining the private key schema we started from two of the shadow triplet values by multiplying them then subtracting one from it then dividing the result by two to get a third shadow triplet value, which is the shadows' base value. For the public key schema we'll start from the base value side to derive the first two shadow triplet values.

The first two shadow triplet values can be used in more than one way; two are provided in the above examples: the first one, that is, the original values were: "5 mod 7 and 3 mod 7"; the second one we added the shadows' base value to each shadow value and the first two shadow triplet values became: "12 mod 7 and 10 mod 7."

The same can be accomplished by working on the shadows' base value. Recall that "7" was one factor of the product of the shadow values minus one. Two was the other factor. The numbers "14" and "7" could also be used for the shadows' base value as well. From a practical perspective, a value of "2" for the shadows' base value is too low.

Given a value of "14," resulting from the product of the shadow values minus 1, and work it out by first raising the first two shadow triplet values. Then, adding "14" to "5" and we get "19" and by adding "14" to "3" we get "17." Now we have "19 mod 14" and "17 mod 14" for the first two shadow triplet values. By changing the shadows' base value to 14, this changed the range of the values that are used for enciphering to 1 to 13, since they start from "1" to the base value "14" minus "1," which is "13." This permits enciphering and deciphering values in the range of "1-13."

The values enciphered with the shadows' base value of "14" can be deciphered by the shadows' base value of "7" as well. The only difference is, if using the base value of "14" and deciphering it with the base value of "7," then the range of the enciphered values are from "1" to "6" and not from "1" to "13." That is the reason that the base value of "2" could not be used, since the range for it would have been from "1" to "1," which means only the number "1." In case the higher factor is used for the shadows' base value for enciphering and the lower factor is used for the shadows' base value for deciphering, then enciphering value must be "1" less than the lower shadows' base value used in the process.

The mathematical operation is illustrated in an example using the first two shadow triplet values in the first example above:

3×5=7×2+1;

5 mod 7 ⇔ 3 mod 7;

12 mod 7 ⇔ 10 mod 7;

19 mod 14 ⇔ 17 mod 14;

19 mod 14 ⇔ 17 mod 7;

17 mod 14 ⇔ 19 mod 7;

19 mod 14 ⇔ 17 mod 2; and 17 mod 14 ⇔ 19 mod 2"

and so on; wherein the ⇔ means that the result from one side of the equation once applied to the other side will produce the same end result.

In the previous example, if we were using it as an asymmetric schema, we certainly would have had a big security problem, since two values were used for the base values "2 and 7" and their byproduct was "14," then all an eavesdropper would have needed to do was to divide the product "14" by "2" and derive "7" and make known the private deciphering key. It would not matter if the product was raised to a very high value, still it would have been revealed by a simple division, the solution to this problem is addressed in an alternative method.

This alternative method is to add "1" to the product of at least three shadow values.

Example 5

For simplicity this example uses three shadow values: "5," "7" and "9." These may be any combination of numbers, such as odd and even values. Odd numbers are preferable and primes are the best candidates.

The product of "5," "7" and "9" is "315" and adding the value of "1" equals "316." Dividing "316" by "2" equals "158." A factor of "316" is "4" and dividing by 4 equals "79." Therefore, 79 mod 315 ⇔ 4 mod 315" produces the same result as "158 mod 315 ⇔ 2 mod 315" and by adding the product "315" to the first two shadow values we get "(315+59) 374 mod 315 ⇔ (315+4) 319 mod 315" and "(315+158) 473 mod 315 ⇔ (315+2) 317 mod 315" respectively. The best practice is always to use prime numbers and after adding one to the multiplication value and dividing until a prime value is reached, the same applies once deriving the shadows' base value from the shadow values.

An asymmetric schema with three public keys for each value base of the two triplets can encipher values from "1" to "4," since the smallest of the three values is "5". The following are the enciphering and deciphering keys:

Enciphered values for "394 mod 315" can be deciphered with "319 mod 315; 319 mod 5; 319 mod 7 and 319 mod 9."

Enciphered values for "319 mod 315" can be deciphered with "394 mod 315; 394 mod 5; 394 mod 7 and 394 mod 9."

Enciphered values for "473 mod 315" can be deciphered with "317 mod 315; 317 mod 5; 317 mod 7 and 317 mod 9."

Enciphered values for "317 mod 315" can be deciphered with "473 mod 315; 473 mod 5; 473 mod 7 and 473 mod 9."

The value of "2" is a base value as well, it was not included because only the values of "1" will be able to be used for the enciphering and deciphering processes.

Any of the original shadow values of "5," "7" and "9" can be given to three different persons without the possibility of any one person reversing any of the other keys since once the product "315" value is divided by the individual's key (5, 7 and 9) the result will be the product of at least two other keys, in the example three shadow values or keys are used, but it could be any number of keys. A further improvement in security is possible using multiple bases.

The above schema is a good way for a group of people to securely communicate but it still has a drawback and a solution as well. The drawback is based on the product of the base key being used for enciphering and deciphering as well and as is it cannot be used for asymmetric key where the public key needs to be published and in use by the general public.

An improvement providing a solution to the drawback. It may be recalled that once exponentiation is applied to the shadows' base value, the shadows' base value can be used for enciphering but not for deciphering. This is because the result contains the product of all the shadows' base values and each of the shadows' base value as well. Once deciphering is applied to the shadows' base value after its exponentiation, the end result will still have the product and each shadows' base value as well.

After exponentiation is applied the base value along with the product of the shadows' base values, they can be used for enciphering/deciphering, one number of the shadows' base value can be used as public key and another of the shadows' base value as the private key.

Thus, a method according to the invention is implemented on a computer for enciphering/deciphering data (1000), also referred to as a first computer, by operating a first computer program (1022) for enciphering data (1012), the method comprising the steps of: selecting a first shadow value (1105), a second shadow value (1135) and a base value (1112); selecting an exponent value (1054); raising the base value (1050), the first shadow value (1105) and the second shadow value (1135) to the exponent value (1050) to form a modified base value (1112), a modified first shadow value (1105) and a modified second shadow value (1135), respectively; reading data to encipher (1102), wherein that the data to encipher (1102) is in the form of a numerical value (1102) from "1" to the base value minus "1"; multiplying the numerical value (1050) with the modified first shadow value (1105) to obtain a product value (1106); taking a modulus operation of the product value and the modified base value (1112) and the result of the modulus operation is the enciphered value (1114). The enciphered value (1114) is then sent to a recipient who alone, or in combination with another, deciphers the enciphered value (1114) and displays the data that was first enciphered.

Shadows and Bases

FIG. 1 is a plot with the y-axis (100) showing the shadow values and the x-axis (110) showing the shadows' base values. The shadow value "5" (120) and the shadow value "3" (130) are shown with a bullet on the y-axis. The x-axis (110) plots the shadows' base values of: "2" (140), "7" (150) and "14" (160). The value "14" (160) is also a shadows' base value because it is one of the two factors of "14" and "1." The shadow value "5" (120) and shadow value "3" (130) are multiplied together equaling "15." The value of "1" is subtracted therefrom to yield the shadows' base value "14" (160). Next, the shadows' base value "14" (160) is divided by "2" (140) yielding "7" (150). The values "2" and "7" being factors of the shadows' base value "14" are also shadows' base values.

Each shadows' base value is operable to encipher/decipher from the value of "1" to the shadows' base value minus "1." The enciphering of the higher value can be deciphered by any of the lower shadows' base values. The only limitation is the range that is limited to the shadows' base value minus "1." For instance, if the shadows' base value of "14" (160) is used to encipher the deciphered values will be "1-13" and it will be the values of "1-6" for the base "7" (150) and "1" for the shadows' base value "2" (140).

Figure 2:
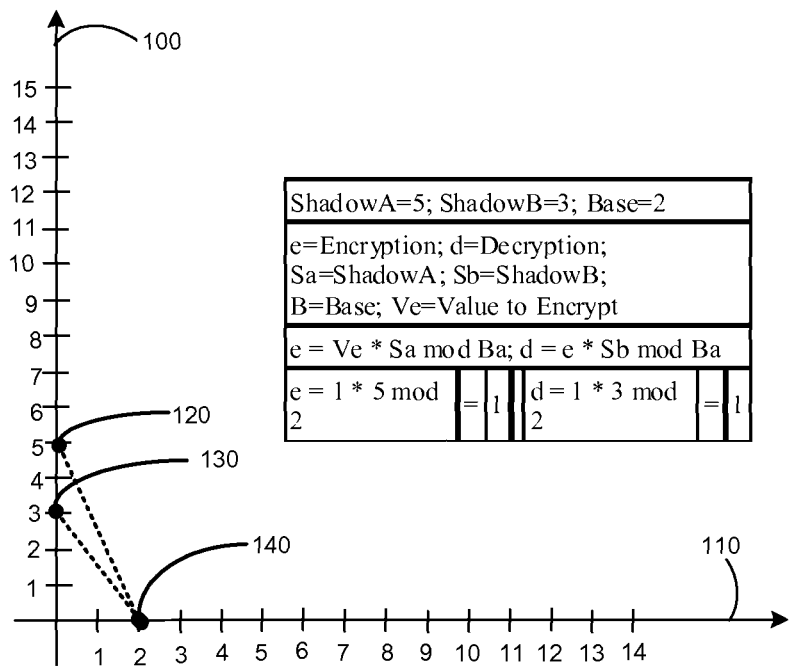
FIG. 2 illustrates a further embodiment of FIG. 1 where the base value of "2" along with a table showing the shadow's value of "3" and "5" being used for enciphering and deciphering the value of "1."

FIG. 2 illustrates shadows' base value "2" (140). Under the encryption rules previously discussed, this shadows' base value can only encipher and decipher the value of "1." Thus, it is not functional and can be ignored all together.

Figure 3:
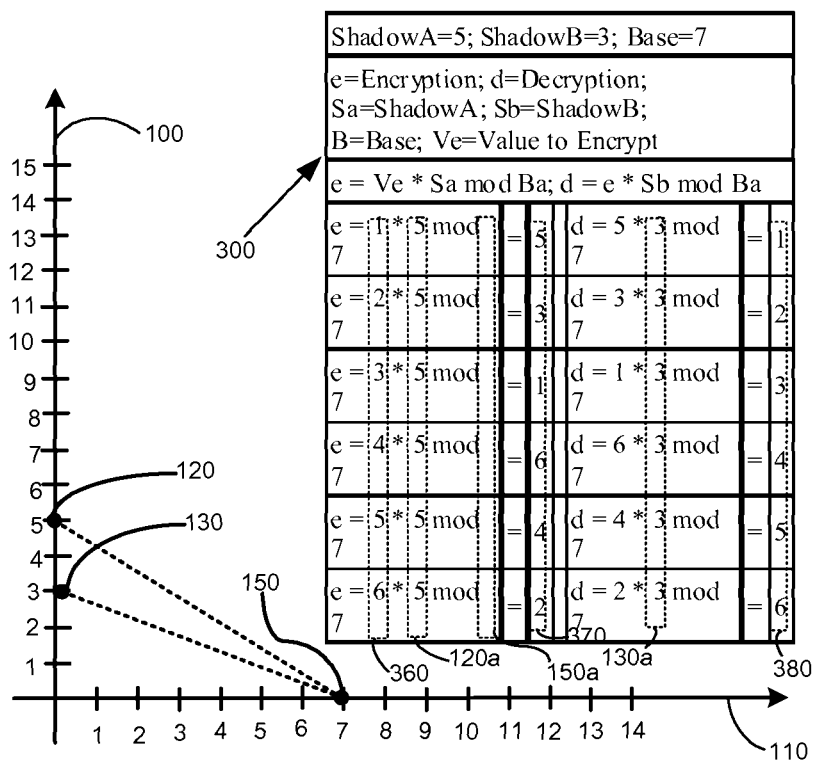
FIG. 3 illustrates a further embodiment of FIG. 1 where the base value of "7" along with a table showing the shadow's value of "3" and "5" being used for enciphering and deciphering the values of "1-6."

FIG. 3 illustrates the shadows' base value "7" (150). The accompanying table (300) has three columns: A first column (120a) represents the shadows' base value of "5" (120); a second column (150a) represents the base value of "7" (150); and a third column (130a) represents the shadow value of "3" (130). A fourth column (360) lists the input values for the multiplication in the encryption process; a sixth column (370) is the output of the multiplication, and a seventh column (380) shows the original value after it is applied through the decryption process.

Figure 4:
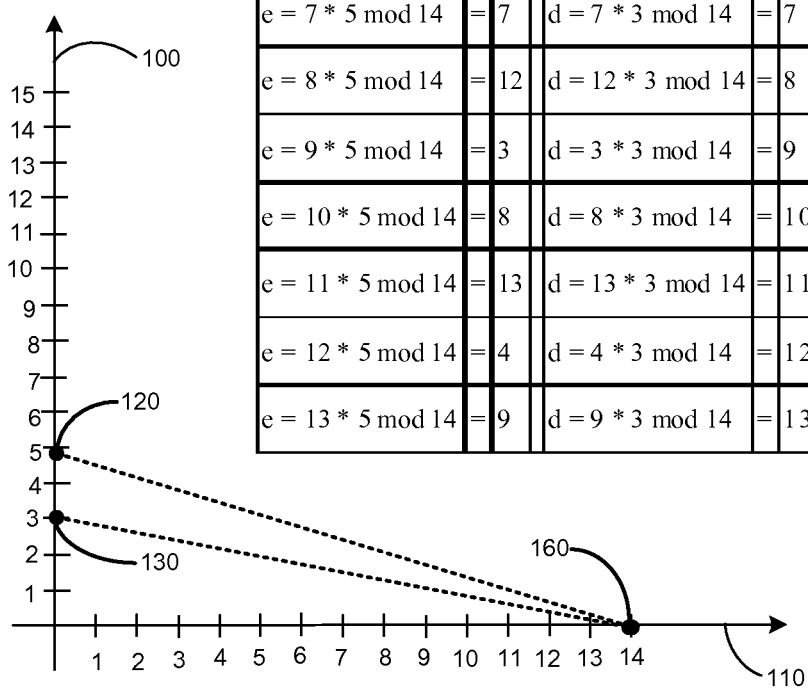
FIG. 4 illustrates a further embodiment of FIG. 1 where the base value of "14" along with a table showing the shadow's value of "3" and "5" being used for enciphering and deciphering the values of "1-13."

FIG. 4 illustrates the shadows' base value of "14" (160) for the shadow value of "5" (120) and the shadow value of "3" (130). The same explanation for FIG. 3 applies here, mutatis mutandis.

Multiple Shadows

A single shadow value yields at least two factors, which are the shadows' base values. Ignoring the factors including the number 1, the other factors are the ones preferred in implementing the disclosed encryption method. Of these other factors or shadows' base values (each sometimes referred to simply as the "base"), one is usually higher or larger than the other(s). In the method of the invention, the values enciphered with the higher shadows' base value can be deciphered with a lower shadows' base value. The values that can be deciphered are from "1" to the base value taking part in the deciphering minus "1."

Figure 5:
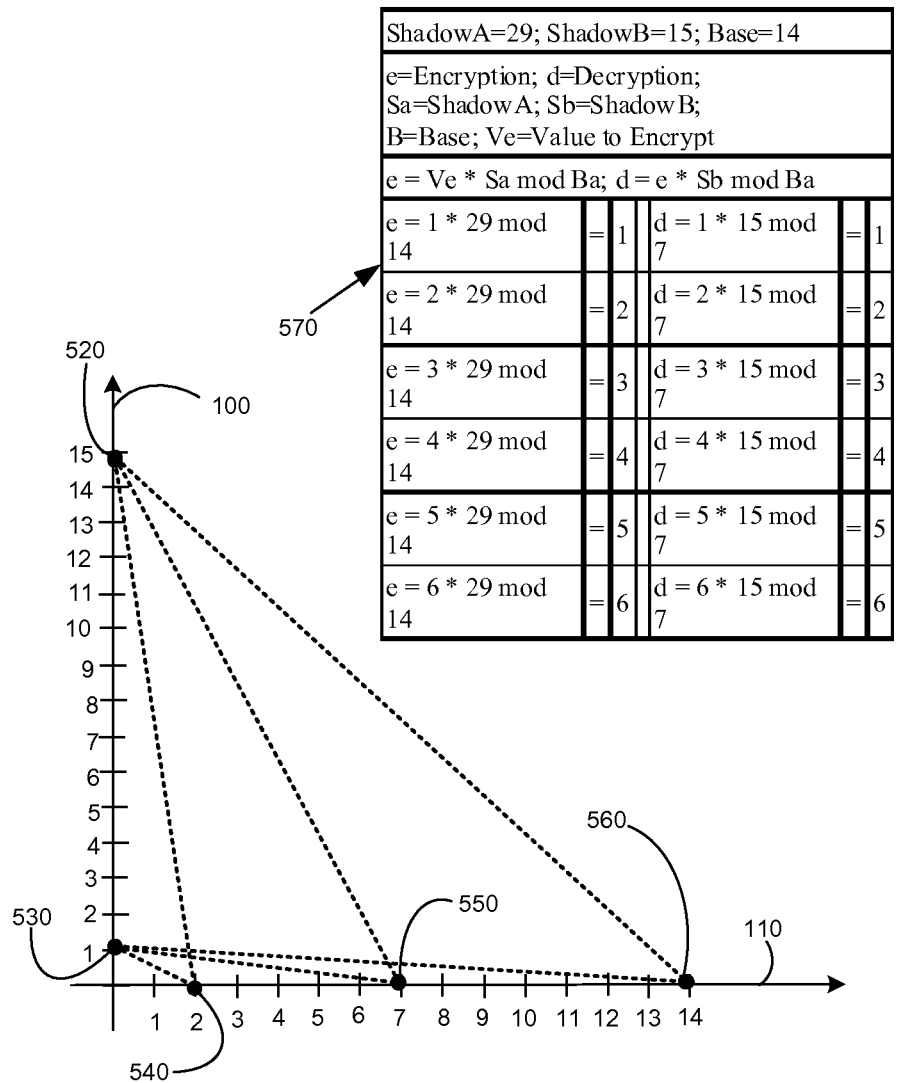
FIG. 5 illustrates a further embodiment of FIG. 1 where three base values takes part of the shadow value composite and it is the multiplication of "5" and "3" in which the value of "15" is derived and its companion is the value of "1."

FIG. 5 illustrates the shadows base values where one of the two factors is the number 1. This was intentionally omitted from the examples above for sake of simplicity. The shadow values "15" (520) and "1" (530) have shadows' base values of "2" (540), "7" (550) and "14" (560). The shadow value "15" (520) and the shadow value "1" (530) are multiplied together. Their product is "15." The shadow values of "15" and "1" cannot be used for enciphering and deciphering, since each side of ciphering and deciphering equations would produce the same value as the starting value without producing any change. This is illustrated at the table 570 with the base value of "14" added to both shadow values thus producing "29" and "15."

As per the last example, which was illustrated in FIG. 5, every shadow value will have a shadows' base value. In a previous example, shadow values "3" and "5" were used to derive the shadows' base values "14," "7" and "2." Thus, it was illustrated that for each pair of shadow values we had multiple shadows' base values that can be used for enciphering/deciphering.

Thus, implementable steps comprise multiplying the enciphered value and the second shadow value to create a product value; and determining a modulus-result value comprising a modulus of the product value and the base value, wherein the modulus-result value is the original data to encipher, that is, the deciphered value.

The only difference with shadow values in relation to the shadows' base value is that if we encipher shadow values with one shadows' base value any other shadows' base value can be used in the deciphering. Given a shadow value of "3" to encipher, the shadows' base value of "2" and "7," or, their product "14" must be used for deciphering and vice versa, if the value of "14" is used to encipher the value of "2" must be used to decipher. Regarding the base it still will function as before, the higher values can be used in the enciphering process and the lower values in the deciphering.

Each shadow value creates a shadows base value with another shadow value. The highest and the lowest shadows' base values can be disregarded because they do not produce enciphering/deciphering. For example, assume "3," "5" and "7" are shadow values. Multiplying "3," "5" and "7" yields "105" (3*5*7=105) from which "1" is subtracted to yield "104." Factoring "104" is easily done by dividing it by "2" or any other whole number by which it is divisible. Factoring "104" by dividing by "2" yields "52." Dividing "52" by "2" yields "26." Dividing "26" by "2" yields "13," which is not further divisible because it is a prime number. Thus, four shadows' base values are "104," "52," "26" and "13." It is not necessary to find all of the factors of "104," since any two will work for the enciphering/deciphering.

The shadow value of "5" could be used to encipher with any of the shadows' base values. For example, one may use the shadows' base values of "13" for deciphering what is enciphered with the shadow value of "5," or what is enciphered with the product of "7" and "3."

Example 6

Using the same shadow values of "3," "5" and "7" and also using the shadows' base value of "13" one may encipher and then decipher the value of "6." This is accomplished by performing three steps: multiplying the value of "6" by the first shadow value "3" modulus "13" to produce a first result; multiplying the first result by the next shadow value "5" modulus "13" to produce a second result; and multiplying the second result by the next shadow value "7" modulus "13" to yield the original enciphered value of 6. This is represented by the equation:

$$6*3 \mod 13 = 5 \Rightarrow 5*5 \mod 13 = 12 \Rightarrow 12*7 \mod 13 = 6;$$

where * indicates multiplication.

Deciphering the enciphered value 6*3 mod 13=5 is also possible with the product of the remaining shadow values of "5" and "7:" the product is "35." This is accomplished with two steps: multiplying the first result by the product of the other two shadow values "5" and "7" modulus "13." Since this product is "35," the first result is multiplied by 35 mod 13 to equal the original value of "6."

These enciphering and deciphering steps are:

$$6*3 \mod 13 = 5 \Rightarrow 5*35 \mod 13 = 6.$$

The above arrangement can be used for enciphering a message that must be deciphered by two or more recipients at the same time.

Example 7

Assume the same shadow values as above, namely "3," "5" and "7." The same shadows' base values result and are "104," "52," "26" and "13." Bob has a message, "message," for Bruce and Alice and both must be able to read the message or none will be able to read it. Bob enciphers the value of "message" to and enciphered message, "e-message," with the step:

"message*3 mod 13"

Bob then sends the e-message to Bruce and Alice. The shadows' base value is "13." Bob may split "13" in two values which when added together equal "13." So, Bob splits the shadows base value of "13" in "10" and "3." Together "10" and "3" are also considered shadows base values. Bob could also split it into "8" and "5," "7" and "6," or "1" and "12." As long as the final sum of the two produces the original shadows' base value of "13," it will serve the deciphering method.

Upon sending the e-message to Bruce, Bob then sends Bruce shadows base values of "3" and "10." Bob also sends to Alice the shadow values of "5" and "13" upon sending her the enciphered message. Once Bruce receives the e-message, Bruce will add the shadows' base values ("3" and "10") together and produce the shadows base value of "13" (3+10=13) and apply it in the deciphering method. Since Bob enciphered with one shadow value and the shadows base value, the deciphering process must include the other two shadow values.

Example 8

Assume the same shadow values as above, namely "3," "5" and "7." The same shadows' base values result and are "104," "52," "26" and "13." Further assume that Bob wants both recipients of e-message to cooperate in order to decipher the e-message. Assume that the message equals the value "6."

Bob enciphers the value of '6' with shadow value of "5" and the base-value of "26" and creates the e-message. Bob then sends shadow value of "3," the base value of "26" and the e-message to Bruce. Bob also sends the shadow value of "7" and the base-value of "26" to Alice along with the e-message, and they both must now cooperate to decrypt the e-message. This encryption and decryption process has steps of:

enciphering by the sender (Bob) the original value of "6" using the step of 6=>6*5 mod 26=4, where "4" is the e-message;

operating on the e-message by a first recipient (Bruce) by applying a first step of 3 mod 26=>4*3 mod 26=12, where "12" is an intermediate result;

deciphering the encipher value by a second recipient (Alice) by applying a second key of 7 mod 26 to the intermediate result of "12" using a step of 12*7 mod 26=6

Bruce and Alice's cooperation enables them to decipher the encipher value to return the message, i.e., the original value of "6."

The above example produces the same result if the product of the two deciphering shadow values is used along with the sum of values that produce the shadows' base values. This is illustrated in an example.

Example 9

Assume the same shadow values as above, namely "3," "5" and "7." The same shadows' base values result and are "104," "52," "26" and "13." Further assume that Bob wants both recipients cooperate in order to decipher the message. Bob enciphers the original value of "6" to an e-message of "4" by multiplying the original value times the shadow value "5" modulus the shadows base value of "26," which is represented by an operation comprising $$6*5 \bmod 26 = 4$$

Bob then sends Bruce: the shadow value of "7;" the shadows' base value of "10" and the e-message of "4." Bob also sends and to Alice: the shadow value of "3, which corresponds to the shadows' base value of "10" sent to Bruce; the shadows' base value of "16;" and the e-message of "4." Bruce and Alice disclose to each other the shadow values ("10" and "3") provided to them by Bob. To decipher the e-message of "4," a method is employed comprising the steps of:

multiplying shadow values together in an operation comprising $$3*7 = 21, \text{ where "21" is a product;}$$

adding the shadows' base values in an operation comprising $$16 + 10 = 26, \text{ where "26" is a sum;}$$

deciphering to the message by multiplying the e-message and the result of the product modulus the sum, in an operation comprising $$4*21 \bmod 26 = 6, \text{ where "6" is the message, i.e., the original value.}$$

The method works by sending a shadow value and a common shadows' base value to both recipients along with the e-message. Each one of the recipients applies the personal key to the e-message to obtain the intermediate value. Then applying the second shadow value to the intermediate value and using the shadows' base value according to the method will decipher the intermediate value and retrieve the message, i.e. the original value. The method also works by using the product of the two shadow values and the sum of the two shadows' base values to produce the common shadows' base value.

This same methods may be used for any number of shadow-values to produce encryption that requires two or more individuals to decrypt.

Example 10

A potential use of the method involves controlling an electronic dispensing machine to require a deciphered electronic signature that can only be deciphered by two or more people entering their public key. For instance, a bank only dispenses a check with the president's signature if the president, the Chief Financial Officer (CFO) and the treasurer are present to insert their respective keys into the machine (usually using a magnetic card with the personal keys encoded on it) then the machine prints the check with the president's signature. Or, if the president is not present then it requires the Chief Executive Officer (CEO), CFO and the treasurer to provide their respective keys for the machine to dispense the check with the president's signature, this is a mechanism that may be used in electronic and/or manual transactions to prevent unauthorized asset disbursal.

An alternative embodiment of the method employs a step of adding a shadow value to one of the shadows' base values; and adding another shadow value to the product of the other shadows' base values. Assume the same shadow values as above, namely "3," "5" and "7." In this operation, the first shadow value of "3" is added to the product of the other two shadow values ("5" and "7"). The same shadows' base values result and are "104," "52," "26" and "13." Using the shadows' base value of "13," the operation comprises the steps of determining:

$$13 + 3 = 16, \text{ where 16 is a first sum; and}$$

$$13 + 35 = 48, \text{ where 48 is a second sum.}$$

Then, using an original value of "6," the encryption and decryption process comprises the operation $$6*16 \bmod 13 = 5 \Rightarrow 5*48 \bmod 13 = 6$$

If further security is desired, the first sum, the second sum and the shadows' base value may be raised to a power before the operation is performed, such as, to the power of two as in an operation comprising:

$$16^2 = 256,$$

$$35^2 = 1225 \text{ and}$$

$$13^2 = 169.$$

Then, using the message, i.e. an original value of "6," the encryption and decryption process comprises the operation $$6*256 \bmod 169 = 15 \Rightarrow 15*1225 \bmod 13 = 6.$$

In the above example Bob could have sent to Bruce the shadow value of "400" and a shadows' base value of "10" and to Alice the shadow value of "324" and a shadows' base value of "3." Bob could have enciphered the message to e-message using the operation:

$$\text{message} * 256 \bmod 169."$$

Alice and Bruce could have deciphered the e-message to the message using the operation $$\text{e-message} * 129600 \bmod 13.$$

Multiple Bases and Public Encryption

The process may also be demonstrated using the shadow values of "3" and "5," and the shadows' base value of "7." The method comprises steps of:

adding the shadows' base value to the shadow values:

7+5=12, where 12 is a first sum; and

7+3=10, where 10 is a second sum;

raising the first sum, the second sum, and the shadows' base value to the power of "2:"

12^2=144;

10^2=100; and

7^2=49.

Any power or exponent may be used. The exponent "2" is used for simplicity and ease of understanding. A "message" is enciphered to an "e-message" using the step of:

message*100 mod 49 and the resulting e-message can be deciphered with:

e-message*144 mod 7;

or, encipher with:

message*144 mod 49 and decipher with:

e-message*100 mod 7.

Thus, the computer device employing these steps comprises a computer for enciphering/deciphering data (1000); a computer-readable medium capable of non-transitory data storage and configured to be accessible by the computer (1008); and computer-readable instruction codes (1022) stored on the computer-readable medium and operable on the computer to implement a method comprising the steps of: selecting a first shadow value (1105), a second shadow value (1135) and a base value (1112); selecting an exponent value (1050); raising the base value (1050), the first shadow value (1105) and the second shadow value (1135) to the exponent value (1050) to form a modified base value (1112, 1142), a modified first shadow value (1105) and a modified second shadow value (1135), respectively; reading data to encipher (1102), wherein that the data to encipher (1102) is in the form of a numerical value (1102) from "1" to the base value minus "1"; multiplying the numerical value (1104) with the modified first shadow value (1105) to obtain product value (1106); and determining a result value (1106) comprising a modulus between the product value (1106) and the modified base value (1112), wherein the result value (1112) comprises the enciphered value (1114). To decipher, the computer-readable instruction codes are further operable to implement steps comprising: multiplying the enciphered value (1132) and the modified second shadow value (1135) to create a product value (1136); and determining a deciphered value (1144) comprising a modulus between the product value (1136) and the base value (1142).

The instruction codes (1022) may be further operable to implement steps comprising: multiplying the first shadow value (1105) and the second shadow value (1135) to produce a shadow product (1106); and subtracting the value of '1' from the shadow product (1050) to produce the base value (1112, 1142).

The instruction codes (1022) may be further operable to implement steps comprising: multiplying the first shadow value (1105) and the second shadow value (1135) to produce a shadow product (1106); subtracting the value of '1' from the shadow product (1050) to produce a shadow difference (1105, 1135); and producing a positive quotient value (1050) comprising a division using the shadow difference (1112, 1142) and any divisor value (1050) that it can divided with and producing the value of '0' for the remainder; and using the positive quotient value (1050) of said division as the base value (1112, 1142).

The above methods can be used for public encryption if the recipient will only receive enciphered message and not need reply to any of them with an encrypted message. If the recipient also needs to reply with an encrypted message, then one of two enciphering shadow values can be the public key and the other one can be the private key. Also, the above methods can be used for two-way encryption where each encrypted message recipient must exchange their respective public keys to perform the deciphering steps.

The above methods enable one-way enciphering and decryption. They do not enable enciphering and decipher from both the sender and the recipient(s) without the recipient(s) performing the same encryption method prior to returning a secure message. Two-way public encryption, however, is possible.

Example 10

Assume the same shadow values as above, namely "3," "5" and "7" and the same shadows' base values of "104," "52," "26" and "13." Recall also the earlier operation raising the first sum ("12"), the second sum ("10") and the selected shadows' base value ("7") to the power of "2," yielding "144;" "100;" and "49."

A pair of shadow values may be selected for use by the public to decipher e-messages sent by a sender to a group (public) possessing a public key. In this example, the public has the shadows' base value raised to a power. For this example, the same power or exponent as above is used, namely "2" to raise one of the shadow values to this power. Recall that using an exponent adds security to the process.

Using the shadow value of "7," then the public is given a first shadow value of 7^2="49." Using the methods above, a second shadow value may be derived from the first shadow value of "49," for example, by multiplication with a number. Recall that any shadow value participating in the derivation of the shadows' base value will produce corresponding shadow base values that can be used for the purpose of enciphering and deciphering.

The selected number for multiplication will also be the value "2" in order to keep the numbers smaller for discussion purposes. This selected number may be any value. The remaining steps in this method are:

producing a second shadow value by multiplying the first shadow value of "49" by the value "2" to yield "98;"

adding the value of "1" to the second shadow value to yield "99;"

factoring "99" to produce to yield "9" and "11," where "9" comprises a first shadows' base value and "11" comprises a second shadows' base value;

adding the first shadows' base value to the second shadow value according to the operation 9+98=107, wherein "107" is a third sum;

adding the second shadows' base value to the second shadow value according to the operation 11+98=109, wherein "109" is a fourth sum;

raising to the power of "2" the third sum, the fourth sum and the second shadow value according to the operations $107^2=11449$, wherein the value "11449" is a first public shadow key;

$109^2=11881$, wherein the value "11881" is a second public shadow key; and $98^2=9604$, wherein the value "9604" is a third public key.

The first public shadow key or the second public shadow key may be given to the public. For example, assume that the first public shadow key, "11449," is made public. The second public shadow key, "11881," is kept confidential by a private key owner and becomes a private key.

The public can encipher a "message" with the first shadow value of "49" and the first public shadow key "11449" to produce an "e-message." The private key owner can encipher a "$2^{nd}$ message" with the first shadow value of "49" and the private key "11881." The enciphering step comprises the operation:

message*144 mod 49.

The deciphering step comprises the operation:

e-message*11449 mod 49.

The private key owner will encipher a $2^{nd}$ message to $2^{nd}$ e-message with:

$2^{nd}$ message*11881 mod 9604;

The deciphering step comprises the operation:

$2^{nd}$ e-message*100 mod 7.

This example can be further illustrated using numbers. The enciphered values will be from "1" to "6" from the public side since the lowest shadow value is "7" and the values of "1" to "48" from the private side since the first shadow value is "49." In preferred applications, larger shadow values would be used for additional security.

Public Key Example
m=message to be enciphered
e=enciphered message
sve=enciphering shadow value (private)
svd=deciphering shadow value (private)
bve=enciphering shadows' base value (private)
bvd=deciphering shadows' base value (private)
spe=enciphering shadow (public)
spd=deciphering shadow (public)
bp=shadows' base value (public)
Owner Encipher with (Private Key):

$e=m$*sve mod bve m=5

$e=5$*11881 mod 49=17

Public Decipher with (Public Key):

$m=e$*spd mod bp $m=17$*11449 mod 49=5

Public Encipher with (Public Key):

$e=m$*spe mod bp m=5

$e=5$*144 mod 49=34

Owner Decipher with (Private Key):

$m=e$*svd mod bvd $m=34$*100 mod 7=5

Multiple Bases/Shadows Certified Email Solution

Figure 6:
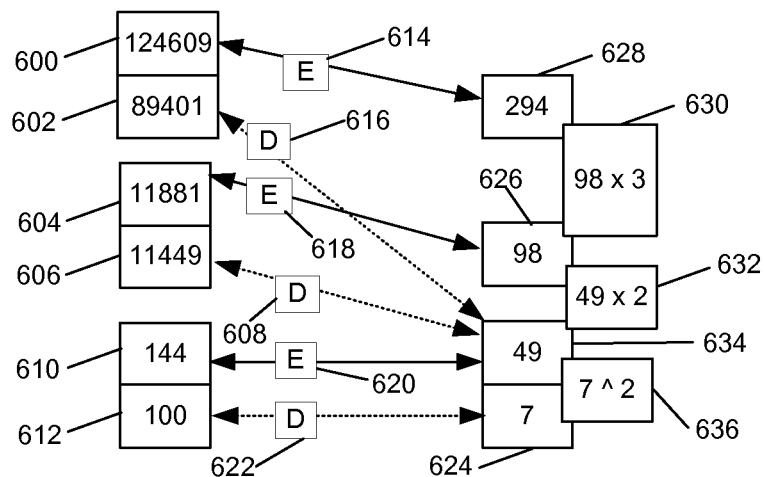
FIG. 6 illustrates multiple base and multiple shadow used for enhanced cryptographic means.

FIG. 6 illustrates what is described above. The base "7" (624) and its deciphering shadow "100" (612) along with its companion enciphering shadow "144" (610) and its base "49" (634). Bases "49" (634) is a product for the raised power of "2" (636) with the base "7" (624). Base "49" is multiplied by "2" (632) and the new base "98" (626) and its two companion shadows "11881" (604) and "11449" (606).

The base "7" (624) and shadow "100" (612) are the deciphering private key 622 and base "49" (634) along with shadow "144" (610) the enciphering public key (620). Base "98" (626) along with shadow "11881" (604) are the enciphering private key (618) and base "49" (634) along with shadow "11449" (606) the deciphering public key (608).

Further above we have a new base value "294" (628) and it is the product of the previous base "98" (626) multiplied by "3" 630 and it is the base for shadow "124609" (600) and shadow "89401" (602). The shadow value "124609" (600) is "294" added to the shadow "195" which is "294+59=353" and raised to the power of "2" and it is "$353^2=124609$," the same applies to the lower shadow value "89401" (602) which is the shadow value of "5" and the value of "294" added to it "294+5=299" and raised to the power value of "2" and it is "$299^2=89401$."

Any number of bases and shadow can be implemented, throughout we've multiplied a value to a base value to derive the new base value, it is but one way, it can be raised to the power of any value, multiplied, etc.

Figure 7:
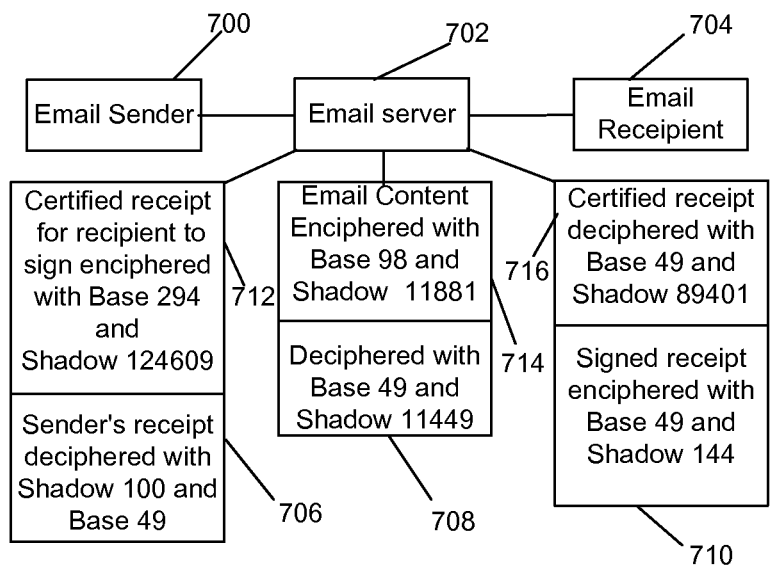
FIG. 7 illustrates the arrangement of FIG. 6 used for email certification.

An example of a use for the above arrangement comprises a plurality of bases and having a plurality of accompanying shadows. FIG. 7 illustrates an email system having means to certify emails for both senders and recipients. An email can be a single email or an archive (attachment) with multiple documents and the can be separate or compressed as a single archive file.

Once email sender (700) sends an email to the email recipient (704); email server (702) creates the enciphering mechanism of FIG. 6 and assigns it to the email (708) and (714). Email server (702) issues a certified receipt (712) to the email sender (700), just like in a Post Office when a piece of certified mail is presented to the Post Office's agent and the agent stamps a receipt certifying that a piece of certified mail has been presented for delivery to a recipient.

The certified receipt (712) is enciphered with the base "294" (628) and shadow "124609" (600)—top—(the enciphering can be just an electronic signature, electronic stamp, etc.) and once the recipient receives the certified receipt (716), it can be deciphered with base "49" (634) and shadow "89401" (602), this will complete the first part of the transaction.

Next, if the recipient (704) accepts the email (708) or (714), a receipt (710) with an electronic signature like "/signature/" is issued and it will be enciphered with the base "49" (634) and the shadow "144" (610) and emailed to email sender (700). Email sender (700) will decipher the certified receipt (706) with the shadow "100" (612) and base "7" (624).

Following, the email (714) is enciphered with base 98 (626) and shadow 11881 (604). After the email recipient (704) accepts the email (708) and the certified receipt (710) is sent to the email recipient (700), the recipient (704) can decipher the email (708) with the base "49" (634) and shadow "11449" (606).

As we might notice, the above arrangement can be used differently as well, it can be used without the top key (628), (600) and (602), if it is implemented this way, then the sender will not receive an enciphered receipt. It is illustrated as is to show the many possibilities that this present invention has to offer and it is only limited by the human imagination.

Furthermore, a combination of sender's private/public key pair can be used along with the email system provided key combinations, for instance, the receipt that the sender will receive from the email server or any kind of server that the solution is implemented therewith, we're using email server for our exemplary explanation for this embodiment of this present invention, the receipt can have an electronic stamp can be enciphered with one of the shadow/base key and an electronic signature enciphered with the system's (email server) private key shadow/base pair and the sender will view the stamp using the public key shadow/base pair from the server and the signature from the server's public key shadow/base combination.

This arrangement can be implemented using a software program where all of the above exchange is done automatically. The idea is the same one used in a physical Post Office whence certifying email, except, this process is done over the Internet or a local network where correspondences are certified and only the intended recipient will be able to accept and read their contents. The recipient cannot deny that he/she receive the certified email, sine a receipt for the transaction is present and only one piece of email will have the enciphering and the deciphering means (shadow/base combination keys) to encipher and decipher the transaction.

Additionally, every user registered with the email server can have a private and public key assigned automatically at the registration time and the receipts' signatures can be electronically signed by using the private key of the email recipient enciphering the recipient's signature and the certified receipt encrypted with the sender's public key. Once the sender receive the receipt, the sender's public key is used to decipher the receipt and the recipient's public deciphering key used to decipher the recipient's signature, this way the recipient cannot deny the he/she didn't accept the enciphered electronic message, email in our example. Once again, the email can be a single or a group of electronic messages compressed in any available file format or PDF (Portable Data Format), ZIP compression format, etc., as well, the message can be sent to a single or a group of individuals using the same described methodology.

Furthermore, the electronic messages can be enciphered with the recipient's public key and the sender's signature enciphered with the sender's private key, and the just mentioned process will take place once the recipient's receive the enciphered message, he/she will decipher with his/hers public key and decipher the signature with the sender's public deciphering key, the process works the same way as when signing the certified receipt. The just mentioned email system using one or more arrangement of the shadow numbering system described throughout the disclosure of this invention can be implemented differently without departing from the true spirit of this invention. As well, a key to identify the email sent/received can be developed and incorporated, like a database key or receipt serial number for tracking the certified email, not shown for sake of simplicity; the idea is that it will function just like the Postal Service certified mail system.

Many more uses of the present invention are possible. For instance, it can be used for protecting a network/Internet communication, password transfer within insecure communication channel and one more example will help to visualize the incredible potential it has to offer. It can be used for securing data in a server and it can be any kind of server, email server, database server, etc. For example, it may be implemented once a user registers with a server. An email server is one use; it can also be used for other kinds of servers and computers as well, such as, laptops, desktops, etc.

Registered Users Shadow Encryption

Once a user registers with the email server two keys are generated and assigned to the user, a private and a public one. They both can be saved on the server or the private key given to the registered user, in case it is given to the registered user, every time he/she logs in a file with it can be uploaded (provide in any conceivable way) to the server along with a password and have the user authenticated this way. If they both are saved on the server, then the user password can be used to mask the private key pair, the masking can be another encryption means or just an XOR with the private key and the password. After this mechanism is implemented then all communication, email in our example, will be enciphered with the recipient public key and the recipient will decipher with the private key, any electronic signing is enciphered with the sender's private key and the revealing of it is done by deciphering it with the sender's public key. This can be implemented in a way that will be transparent to all users.

Figure 8:
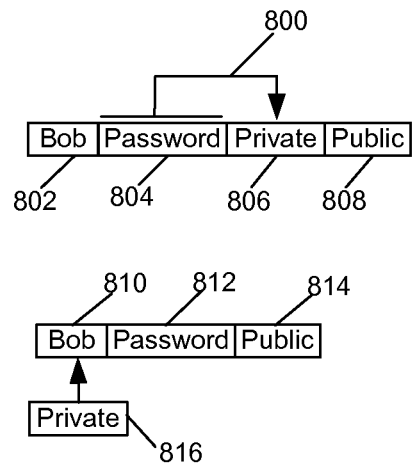
FIG. 8 illustrates private/public shadow key assigned to user at registration time.

FIG. 8 illustrates a registered user with a user id of "Bob" (802) and his password (804) masking (800) the private key (806) and the public key (808) is unmasked. This arrangement can be used with any kind of private key solution and not necessarily exclusive with the shadow/base solution that we've described so far. The second arrangement the user "Bob" (810) has in his private possession, his private key (816) and it can in his desktop computer, laptop computer, removable drive, CD ROM, etc.

In the first arrangement once Bob signs in with the system the system will use his password to unmask the private key and make use of it for Bob's transactions. It can be saved on a user session for the duration of the user interaction with the system's computer. The second arrangement Bob (810) will provide his private key (816) at login time and his password (812) will be used to authenticate him with the server and his private key (816) can be saved on a session variable for the duration of his interaction with the system and the system's server will make use of his public key (814) as it would have done with the first arrangement.

Voter Registration Using Shadow Encryption

Figure 9:
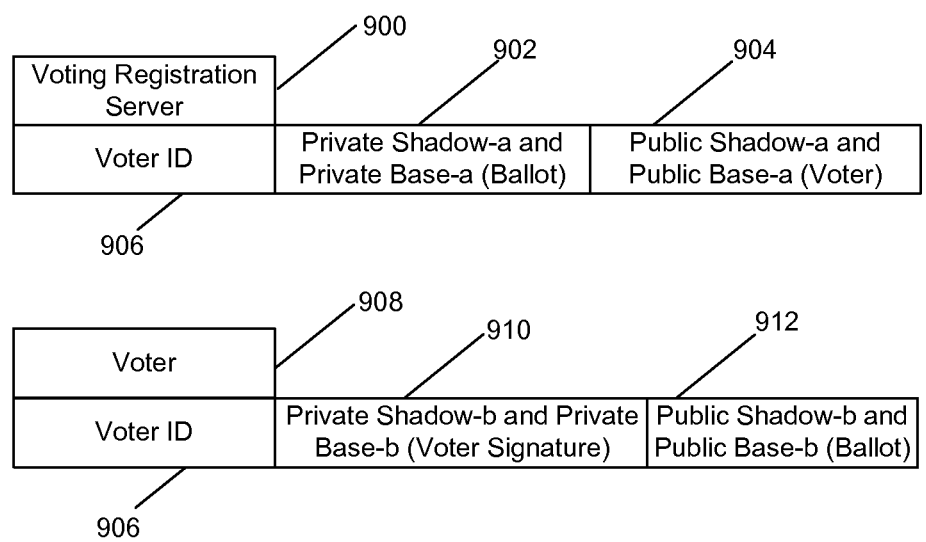
FIG. 9 illustrates a online voting solution using shadow cryptography.

FIG. 9 illustrates one more arrangement where the shadow encryption solution can be used to enhance lives in every segment of society. This figure illustrates a voting system solution where it will safely and inexpensively secure voting online over the Internet or over a Network.

The Voting Registration Server (900) and having the Voter ID (906) and a Private Shadow-a/Base-a Pair assigned to the voter's ballot (902) and a Public Shadow-a/Base-a Pair (904) assigned to the voter (908) and associated with Voter ID (906). Other information like a voter password can be present as well, not illustrated for sake of simplicity and not intent to obscure the present invention. Once voter (908) logs in with the Voting Registration Server (900) a voting ballot will be sent to Voter (908) and it will be related to Voter ID (906). Now, once voter (908) votes two things will happen, first, the voter's signature (electronic) (910) will be enciphered with the Private Shadow-b/Base-b Pair (912) and the Voting Registration Server (900) will use the Public Shadow-a/Base-a Pair (904) to decipher the electronic signature and make sure that the proper voter has done the voting. The confirmation can be base on a secrete phrase, name, question, answer, etc., that only the voter will know and has been pre-assigned to the Voting Registration Server (900) by the voter (908). After the voter finishes voting the voting ballot will be enciphered with the Public Shadow-b/Base-b Pair (912) on the voter (908) side and after it is received by the Voting Registration Server (900), the Voting Registration Server (900) will decipher it with the private key pair (902) of the public key (912).

The few illustrates arrangements are just a few ways that can be implemented using the shadow-base numerical system, many more can be devised and implemented without departing from the true spirit of this invention, the above teaching offers unlimited use for this invention, and its use is only limited to the human imagination.

Enciphering/Deciphering Apparatus

Figure 10:
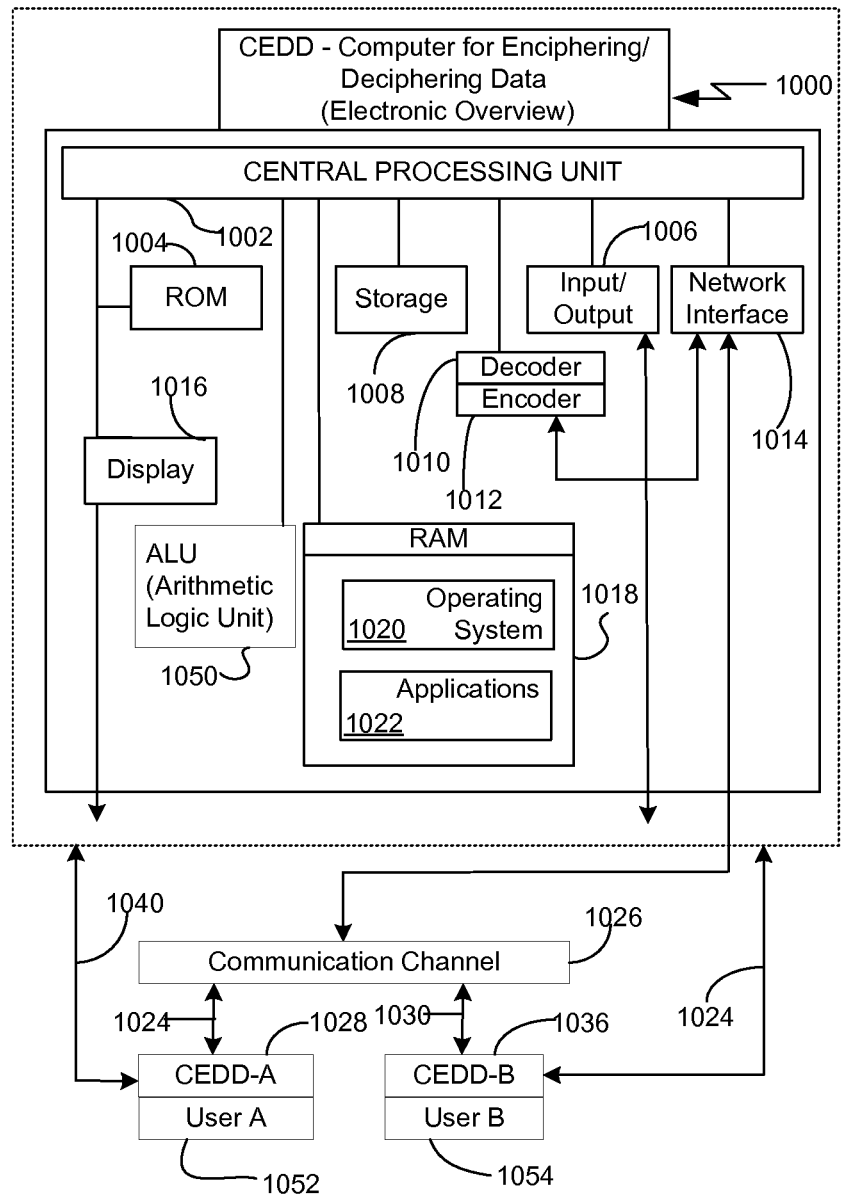
FIG. 10 illustrates an apparatus for processing the enciphering/deciphering of data in which the shadow-base mathematical values as used.

FIG. 10 illustrates a computer for enciphering and deciphering text messages. Any information in its original format is called plain text and once it is encrypted, that is, its value is changed to an unreadable form that is very difficult to produce its original form without the proper key, it is called enciphered or encrypted text, the process of using the proper key value to reproduce its original text is called deciphering or decrypting. The word text is used as common term in the art of cryptograph but it means any kind of data and not necessarily text only, it may be other kind of data like video, images and other formats that are not in the text format.

The CEDD (Computer for Enciphering/Deciphering Data) (1000) of FIG. 10 illustrates a Central Processing Unit, CPU (1002), and it is the brain of the CEDD and once the CEDD is first turned on it will fetch code stored in its ROM (Read Only Memory) (1004) and as the code instructions are processed; it will instruct the CPU (1002) to read other code data from storage (1008); and it can be any kind of storage device including, but not limited to: disk unit, removable storage unit, flash memory, etc., and store it into Read Access Memory, referred to herein as RAM (1018). The storage (1008) unit may store the data to encipher/decipher as well or the data to encipher/decipher may be input and or read from input devices like: Input/Output (1006) and/or network interface (1014).

The data code can be OS (Operating System) (1020) and/or applications program (1022). The application program can be any kind of program like program code to process the computing of the enciphering and deciphering of data depicted herein and if it is code instruction dealing with enciphering/deciphering the CPU (1002) will access the encoding unit (1012) for enciphering data and decoding unit (1010) for deciphering data. The encoding unit (1012) and decoding unit (1010) may be separate units as depicted in the FIG. 10 and FIG. 11, electronic chips or they may be software-code implemented and residing within the application-program code (1022). As the enciphering/deciphering happens the enciphering/deciphering process will make use of the network interface (1014). Both shadow values and the base values are integrated into the application software program (1022) and the application software program (1022) accesses the ALU (Arithmetic Logic Unit) (1050) where operation like (multiplication, exponentiation, division, modulus, subtraction, addition, etc.) are integrated therein. As well as operations like the multiplication of both shadow values and the subtraction of '1' from the product to derive the first base and subsequent divisions to derive subsequent base values are integrated into the application software program (1022) and the application software program (1022) uses the ALU (1050) as needed for said operations. As the CEDD (1000) communicates with the outside world, the network-interface (1014) will use communication channel (1026) and it can but not limited to: wired, wireless networks, radio link, etc. The communication channel (1026) is a non-secured communication-channel means and the communication between CEDD-B (1036) and CEDD-A (1028) are protected by the electronic circuitry of each CEDD (encoder/decoder) (1012, 1010) and each computer device will have at least, all or some of the electronic elements depicted for a CEDD (1000). CEDD-B (1036) and CEDD-A (1028) may be any computing device without departing from the teachings of the present invention, as well they may be the computing device where a user receives and view enciphered data as needed (1052 and 1054).

The CEDD (1000) will have means to communicate with a user using the CEDD like a keypad and other interfacing elements and is done through the IO (Input Output) port (1006). The CEDD (1000) also has means for presenting information to a user through its display (1016) and it can be any kind of information, including but not limited to: numerical display, graphical display, LED (Light Emitting Diode) display, etc.

FIG. 10 a CEDD (1000) has encoder (1012) and decoder (1010) and they are used for the enciphering and deciphering of information (data) at a single CEDD or in between two or more CEDDs.

Figure 11:
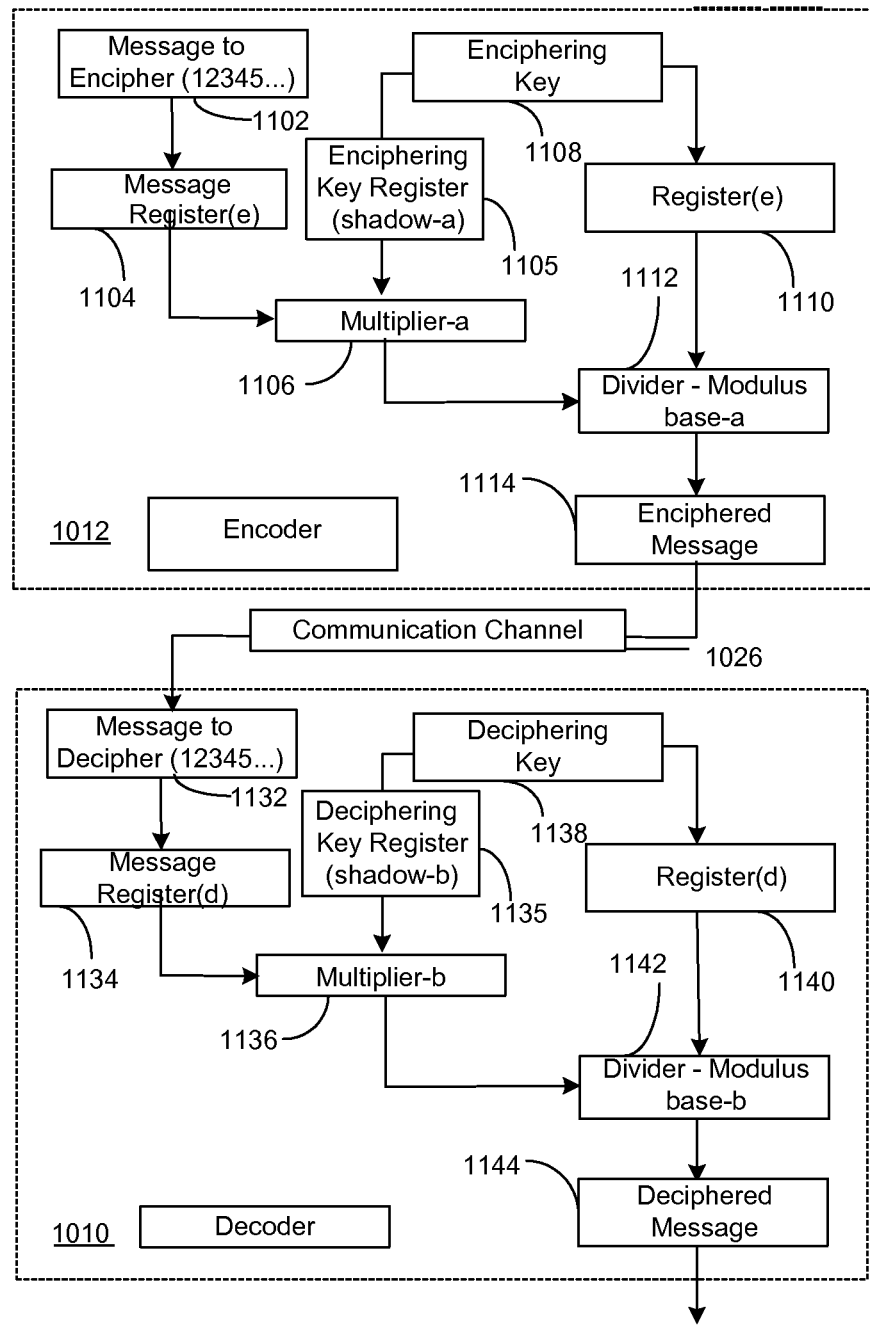
FIG. 11 illustrates a further embodiment of FIG. 10 wherein the encode/decode modules of FIG. 10 are depicted thereon.

FIG. 11 illustrates electronic block for decoder (1010) of FIG. 10 and the encoder (1012) of FIG. 10.

Messages to encipher (1102) are placed one byte at a time on the message register (1104) and the enciphering key (1108) (shadow-a) which is in the enciphering key register (1105) along with the message to encipher (1102) that is in the message register (1104) are shifted into the multiplier (1106). Now, the enciphering key (1108) (base-a) is placed into the n Register (1110) and shifted into the divider (Modulus base-a) (1112) along with the output from multiplier (1050), multiplier (1050) and Modulus base-a (1112) can be a single unit, as needed, other units can be implement on the same unit as well like but not limited to: a unit do add and another unit to subtract and units (1106, 1136, 1112, 1142) are implemented inside the ALU unit (1050). Once the data is output from divider (1112) it will be the enciphered message (1114).

The encoding unit (1012) and the decoding unit (1010) can be in a single CEDD or in two separate CEDDs without departing from the true spirit of this invention. After the enciphered message (1114) leaves the CEDD (1000) (FIG. 10) though its network interface (1014), also referred to as a communication port (FIG. 10), it will travel the communication channel (1026) and it is the same communication channel of FIG. 11. For example, the encoder (1100) may be at CEDD-A (1024) and decoder (1130) is at CEDD-B (1036) (FIG. 10).

After the enciphered message (1114) leaves the sender CEDD-A (1024) (FIG. 10) and travels the communication channel (1116) (1026—FIG. 10) and reaches the receiving CEDD-B (1036) (FIG. 10) the deciphering of the enciphered message will starts at the decoding unit (1010) (FIG. 10) will begin. At the decoder (1010) the message to decipher 1132 is placed into the message register 1134 and the deciphering key 1138 (shadow-b) is placed into the deciphering key register 1135 the two are shifted into the multiplier-b 1136. The deciphering key 1138 (base-b) is placed into the Register(d) 1140 and once the output from multiplier-b 1136 is received by the divider (modulus base-b) 1142 the deciphering of the enciphered message (1114) will occur and the output from divider (modulus base-b) 1142 will be the deciphered message 1144, plaintext message, thus, the cycle from enciphering to deciphering messages.

Solving Puzzles with Shadow Numbers

An example is the Post Office Puzzle that uses the shadow-numbering system. Assume that there is a Post Office in a country and the Post Office is highly vulnerable to theft in that any valuable that is be sent in the mail system is opened illicitly and the valuable removed, but any box with a lock on it is not tampered with.

Assume that Bob lives in one city in that country and Alice lives in another city in that country. Assume further that Bob and Alice couldn't meet, but Bob wanted to propose to Alice. Bob telephoned Alice and they devised a scheme. Bob would place the ring in a box and place a lock on it and keep the key, then send it to Alice. Bob could not just send the key to Alice because the key would be stolen. So, once Alice received the box, she would place another lock on the box and send it back to Bob. Once Bob received the box with the two locks, he removed his lock and sent it back to Alice. Once Alice received it she removed her lock from the box and got the ring.

Solving this puzzle using the shadow-numbering system is easy. The Post Office is the transporting system and the box with the locks and the ring inside is the shadow triplet values. We'll be using the shadow triplet values of "3," "5" and base "7."

R=ring and it is the value of "3."
B=box and it is the value of "7."
Bob=picks the shadow value of "3" and his lock value is "2."
Alice=picks the shadow value of "5" and her lock value is "3."

Bob=3*3=9=>9+2 mod 7=4=>he sends "4" to Alice.

Alice=4*5=20=>20+3 mod 7=2=>she sends "2" to Bob.

Bob=2*3=6=>6-2 mod 7=4=>he sends "4" to Alice.

Alice=4*5=20=>20-3 mod 7=3—she now has the ring and it is the value of "3."

Redoing the above Post Office puzzle, but this time around we'll be subtracting the values, instead. The lock values will be changed as well to accommodate subtraction. Bob will use "4" for his lock, Alice will pick "2" for hers.

R=ring and it is the value of "3."
B=box and it is the value of "7."
Bob=picks the shadow value of "3" and his lock value is "4."
Alice=picks the shadow value of "5" and her lock value is "2."

Bob=3*3=9=>9-4 mod 7=5=>he sends "5" to Alice.

Alice=5*5=25=>25-2 mod 7=2=>she sends "2" to Bob.

Bob=2*3=6=>6+4 mod 7=3=>he sends "3" to Alice.

Alice=3*5=15=>15+2 mod 7=3—she now has the ring and it is the value of "3."

Bob and Alice became so clever that they decided to communicate using the new found algorithm to fool the Post Office. Bob would send "love" to Alice. All characters will be converted to numerical values, "a"="1," "b"="2," ... "z=26," etc. The values of the character set table representing the enciphered characters can be used as well. Bob adds the values of "4, 3, 2, 1" starting from the letter "l" 4 is added to; "o" 3 is added to, etc; and Alice subtracts the values of "1, 2, 3, 4" starting from the letter "l." Using the triplets of "17," "2" and base "33," the base's value is added to the shadow values and the sums equal: "50," "35."

Message="love"="12 15 22 5"
Base="33"
Bob=picks the shadow value of "50."
Alice=picks the shadow value of "35."
Bob=sends "10 27 13 20" to Alice.
Alice=sends "19 19 23 3" to Bob.
Bob=sends "22 23 26 17" to Alice.
Alice="12 15 22 5"—she now has the word of "love."

The values can be raised to power as well as long two bases are used, for instance, the shadow's could've been: "2500" and "1225" and Bob's base "1089," as long as the recipient keeps the original base, the value of "33," Alice in this case, all will work the same. An eavesdropper will have to guess all the masking values to each value being enciphered by sender and receiver. The above algorithm will have a great deal of use in open channel communication, since the enciphering key can be masked and be used to encipher the actual message, the enciphering key can be XORed on the message and it will be a much faster way than the currently available means. The initial process can happen at the handshake time of the initial communication, as well, it can be used to transmit a password in an insecure communication channel. Other means can be devised and new uses implemented without departing from the true scope and spirit of this invention.

The aforementioned arrangement can be used in Smart Cards where the user will login into the server over insecure communication channel passing the disguised password (masked both ways as it was illustrated for the word "love") and the enciphering key assigned to the Smart Card holder for the duration of the session without ever compromising the Smart Card, that is, the Smart Card will never have the enciphering keys therein and in case it is lost, stolen or compromised there will be no way for its illegitimate use nor the deciphering of data stored therein.

A secondary key can be assigned to the Smart Card just for the purpose of saving its data therein, the secondary key will always be stored in a safe server where the user has access, then after user authentication using the masked password means, the secondary key is transmitted to, and used by the Smart Card for the purpose of enciphering and deciphering data stored therein. Another key may be used for enciphering the communication or a single key can be used for both purposes. In case two separate keys are used, then the communication-enciphering key may be runtime-server generated for the duration of the user's interaction session.

With the above two-puzzle solution, a new way of using the shadow numbering system is disclosed. The shadow numbering system was used it to add values to the first puzzle and to subtract values from the second puzzle. The solution is the same. The two puzzles just presented can be used for two-way encryption similar to Diffie-Hellman's algorithm to exchange a private key using smaller values in which will be a great improvement, since an array with all values can be passed each way and the values will always be masked without any possibility of and eavesdropper being able to decipher them, then have the private key used for the enciphering/deciphering process.

Another example uses swans. If all swans are white and we come across a black swan, is it still a swan? Given the notion of the puzzle. The question is if they both are swan then they must be able to crossbreed and reproduce gray swans. If it is the case, then the two swans will end up multiplying them into the new gray swans. Assume that the black swan is of the opposite sex of the white swan, in any case, if all swans are white than the black swan will eventually be able to meet a mate of the opposite sex. That being the case, if the two swans reproduce two—male and female—every year and their offspring—gray swans—produce two—male and female—every year for five years in the end of five years there will be sixty two gray swans from the black and white swans. Then the two shadow values represent the black and white swans, once they are multiplied and the new shadow used with the companion value of one, we'll get the answer of the table in FIG. 5, which illustrates the two species in a linear progression. The colors of the descendant swans do not necessarily need be of gray color, it is just an assumption, of course.

So far, the solutions presented where the shadow-side values are used for producing the base side values and vice-versa. Basically, any value can be used and since every value has a shadow companion value, even the case with prime numbers, the same works for the base side, that is, any value can be used on the base side since it will have at least one companion value, and again, this applies to prime numbers.

Base on these principles, there are other uses where a single shadow value can be used to derive its base, as well, there are case where a single base value can be used to derive its shadows.

Another puzzle will demonstrate the single shadow value uses. This puzzle involves the Two Opposite Travelers—Two travelers will journey from point A to point B. One will start from point A toward point B and the other from point B toward point A. They both can travel at any speed, they both will make their journeys in one hour and they will cross each other along their journeys.

Assume that the distance traveled is the same; that the time that it will take them to start and finish is the same; that they journey in opposite directions; and that they will meet or cross each other. If this puzzle starts with the base value arbitrarily selected as "10," then adding the value "1" to the base value will result in the forward traveler's direction and subtracting the value "1" from the base value will result in the reverse traveler's direction (See Table #1).

Ta=traveler A (forward—A to B).
Tb=traveler B (reverse—B to A).
D=the base distance between the two and it is "10."

$Ta=D+1=>Ta=10+1=11.$ $Tb=D-1=>Tb=10-1=9.$

They meet in the middle and the value is "5."

TABLE #1

| | |
|---|---|
| Ta = 1 * 11 mod 10 = 1 | Tb = 1 * 9 mod 10 = 9 |
| Ta = 2 * 11 mod 10 = 2 | Tb = 2 * 9 mod 10 = 8 |
| Ta = 3 * 11 mod 10 = 3 | Tb = 3 * 9 mod 10 = 7 |
| Ta = 4 * 11 mod 10 = 4 | Tb = 4 * 9 mod 10 = 6 |
| Ta = 5 * 11 mod 10 = 5 | Tb = 5 * 9 mod 10 = 5 |
| Ta = 6 * 11 mod 10 = 6 | Tb = 6 * 9 mod 10 = 4 |
| Ta = 7 * 11 mod 10 = 7 | Tb = 7 * 9 mod 10 = 3 |
| Ta = 8 * 11 mod 10 = 8 | Tb = 8 * 9 mod 10 = 2 |
| Ta = 9 * 11 mod 10 = 9 | Tb = 9 * 9 mod 10 = 1 |

Reversing their positions, demonstrate the principles in the reverse of their starting points. Since the previous puzzle started with the point of view of traveler A's starting point, to reverse, the base is placed in the point of view of traveler B's starting point. To do that, the base is added to the traveler B's, subtract one from the traveler A's and the base will be changed to the reverse point of view, that is, to traveler B's point of view (See Table #2).

Ta=traveler A (reverse—B to A).
Tb=traveler B (forward—A to B).
D=the base distance between the two and it is "10."

$Ta=D-1=>Ta=10-1=9.$ $Tb=D+Ta=>Tb=10+9=19.$

TABLE #2

| | |
|---|---|
| Ta = 1 * 19 mod 10 = 9 | Tb = 9 * 9 mod 10 = 1 |
| Ta = 2 * 19 mod 10 = 8 | Tb = 8 * 9 mod 10 = 2 |
| Ta = 3 * 19 mod 10 = 7 | Tb = 7 * 9 mod 10 = 3 |
| Ta = 4 * 19 mod 10 = 6 | Tb = 6 * 9 mod 10 = 4 |
| Ta = 5 * 19 mod 10 = 5 | Tb = 5 * 9 mod 10 = 5 |
| Ta = 6 * 19 mod 10 = 4 | Tb = 4 * 9 mod 10 = 6 |
| Ta = 7 * 19 mod 10 = 3 | Tb = 3 * 9 mod 10 = 7 |
| Tb = 8 * 19 mod 10 = 2 | Ta = 2 * 9 mod 10 = 8 |
| Tb = 9 * 19 mod 10 = 1 | Ta = 1 * 9 mod 10 = 9 |

There are other ways of producing differentiating values from the shadow triplets. For example, moving both shadows forward (See Table #3).

Sa=shadow A.
Sb=shadow B.
B=base.

$Sa=B+1.$ $Sb=1.$ $B=10.$ $Sa=10+1=11.$

TABLE #3

| | |
|---|---|
| SA = 1 * 11 MOD 10 = 1 | Sb = 1 * 1 mod 10 = 1 |
| Sa = 2 * 11 mod 10 = 2 | Sb = 2 * 1 mod 10 = 2 |
| Sa = 3 * 11 mod 10 = 3 | Sb = 3 * 1 mod 10 = 3 |
| Sa = 4 * 11 mod 10 = 4 | Sb = 4 * 1 mod 10 = 4 |
| Sa = 5 * 11 mod 10 = 5 | Sb = 5 * 1 mod 10 = 5 |
| Sa = 6 * 11 mod 10 = 6 | Sb = 6 * 1 mod 10 = 6 |
| Sa = 7 * 11 mod 10 = 7 | Sb = 7 * 1 mod 10 = 7 |
| Sa = 8 * 11 mod 10 = 8 | Sb = 8 * 1 mod 10 = 8 |
| Sa = 9 * 11 mod 10 = 9 | Sb = 9 * 1 mod 10 = 9 |

Moving both shadows backwards (See Table #4).
Sa=shadow A.
Sb=shadow B.
B=base.

$Sa=B+1.$ $Sb=1.$ $B=10.$ $Sa=(B*2)-1.$

TABLE #4

| | |
|---|---|
| Sa = 1 * 19 mod 10 = 9 | Sb = 9 * 1 mod 10 = 9 |
| Sa = 2 * 19 mod 10 = 8 | Sb = 8 * 1 mod 10 = 8 |
| Sa = 3 * 19 mod 10 = 7 | Sb = 7 * 1 mod 10 = 7 |
| Sa = 4 * 19 mod 10 = 6 | Sb = 6 * 1 mod 10 = 6 |
| Sa = 5 * 19 mod 10 = 5 | Sb = 5 * 1 mod 10 = 5 |
| Sa = 6 * 19 mod 10 = 4 | Sb = 4 * 1 mod 10 = 4 |
| Sa = 7 * 19 mod 10 = 3 | Sb = 3 * 1 mod 10 = 3 |
| Sa = 8 * 19 mod 10 = 2 | Sb = 2 * 1 mod 10 = 2 |
| Sa = 9 * 19 mod 10 = 1 | Sb = 1 * 1 mod 10 = 1 |

Overview

To create a base, start with two or more values by multiplying them and subtracting one from the product's result. Then divide the base by any dividable value that it is dividable with. All the values taking part on the base side will be a base value for the shadow's value-pair.

Any value on the base side can be used for enciphering and deciphering. If a value is enciphered with a value the deciphering can be done with any lower-base value. The enciphering starts with the value of one and up to the base value minus one.

On the shadow side one value is used to produce the enciphering values along with the base value and the other shadow's value is used along with one of the base values (the same used for enciphering or a lower one) for deciphering.

The shadow can have multiple values and if it has, if one is used to encipher, all others or their product, will have to take place in the deciphering process.

Two or more values can take place on the creation process of bases. All the participating values are multiplied and one added to their product, then divide it with any value that can be divided with and the two values becomes the shadow for the base group.

Base values can be added to themselves and to other shadow's values participating with the base. The base and the participating shadow's can be raised to a power value and the same value must be used for the triplet. If the triplet is raised to the power of another value, then one shadow-raised value is used along with the base-raised value and they become the public enciphering key, the other shadow-raised value along with the base value in its original form without being raised to the power of another number, become the private deciphering key.

To produce two-way public key enciphering schema, after the base and shadow's values are raised to the power of another value, multiply any value to the base-raised value add one to it then divide the result with any other value, one of the new shadow's value along with the new base value will be the private enciphering key, the other shadow's value will be the public deciphering key along with the first base-raised value.

Any value used on the shadow side will have at least one shadow companion value and at least two other values as the supporting base. If a value is not dividable by any other value on the shadow side it will have the value of one for its shadow companion; the same is true on the base side, if it is not dividable by any other value, it will have one as the base companion. These scenarios are the case of prime-numbers values. In either case whenever they only have one as a companion value the shadow cannot be used for the process of enciphering nor deciphering, since the same value that is applied on any of the equations will simply reproduce itself, thus, lonely prime numbers are poor values for producing shadows.

The enciphering value is multiplied with one of the shadow's value then the modulus taken with the base value, the deciphering will used the previous result and multiply it with the other shadow value and have the modulus taken with the base value, thus, reproducing the deciphered value from the enciphered one.

This invention can be used in the enciphering and deciphering in any environment, it can be but not limited to: network, Internet, air communication, wired, wireless, archive, in a single apparatus, multiple apparatus, etc.

Basically, any value can be used on the base side to produce differing shadow's direction and for solving puzzles. The process always involves a common modulus value that is common to two other values and once one of the modulus of one of the values is taken with the base value and its result applied (multiplied) with the other value and the modulus is taken again with the base value, the original or other intended value is reproduce. The common modulus is the base and the other values are the shadow of the base.

When creating a base for the shadows and dealing with public key schemes, it is best to have a prime number since it will only produce a single base value. Throughout our examples we've shown small values, it is well known to those of the skill in the art that in real world application very large prime numbers and other values are used and the process of reverting the keys are infeasible without the knowledge of the equivalent private key pair of the public key.

As it is well known to those of the skill in the art of cryptography, the information to be enciphered can be composed in two (diagraph) or more characters and have the composition of characters ciphered as a block, block ciphering. This is a way of producing increased security than by ciphering a single character. It has not been further explained here for sake of simplicity and not intended in any way to obscure the means, scope and use of the present invention.

A method and an apparatus have been taught and a means for transmitting a key/password over insecure channel without the possibility of the deciphering of its content by an eavesdropper. A first signal containing the key/password to be transmitted is transposed with an additional random signal value and the intended signal along with the random signal is transmitted to the receiver and the receiver will transpose a second random signal and return to the sender the two random signals along with the intended signal's message. The sender will remove the first random signal that was inserter by said sender apparatus and transmit the second random signal along with the intended signal's message, upon receiving the two remaining signals the receiver will remove the second random signal that as transposed by said receiver and the intended signal's message is retrieved.

The described embodiments of this invention can be used for other purposes as well besides the ones illustrated herein or combined to form other embodiment without departing from the true spirit and teaching of the present invention. Once the masking technique is used like in solving the of the puzzle where sender and recipient mask the message can be used for transferring a shadow and a base to the recipient then the communication be enciphered using the transparent key. It will greatly enhance communication security between personal device like cellular telephony, PDA, and the like since they lack computational power required with other security solutions.

Furthermore, when we said that it could be used along with Diffie-Hellman's algorithm to produce the transparent shadows then the base, the base value can be a single value and from the base value the shadow-pair is created. As well, since the enciphering values limitation rely on the base value, once a large value for the base is derived, then a block cipher can take place and it can marked as "/start-block/" for starting a block "/end-block/" for ending a block, or, "/block-1/; /block-2/; . . . /block-n/," or any other conceivable way. The base value does not necessarily need to be two values; it can be a single value and the value of "1" added to it and its result divided by any value that it can be divided with, this is true in the case of a prime number value.

Although the present invention and its advantages have been described in detail, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification. As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

What is claimed is:

1. A device for enciphering data comprising:
a computer;
a non-transitory computer-readable medium accessible by the computer; and
computer-readable instruction codes stored on the computer-readable medium and when executed by the computer implement a method comprising the steps of:
selecting a first shadow value and a second shadow value;
wherein the first shadow is an integer greater than 1 and the second shadow value is an integer greater than 2;
calculating a shadows' base value, by multiplying the first shadow value by the second shadow value then subtracting 1 from the shadows' base value to yield a first shadows' base value;
reading data to encipher wherein the data to encipher is in the form of an integer from 1 to the first shadows' base value minus 1;
multiplying the the data with the first shadow value to obtain a product value; and
obtaining a enciphered value of the data by taking a modulus between the product value and the base value.

2. The device of claim 1 wherein the computer-readable instruction codes when executed to implement steps comprising: multiplying the enciphered value and the second shadow value to create a product value; and
determining a modulus-result value comprising a modulus of the product value and the base value, wherein the modulus-result value is a deciphered value.

3. A device for enciphering data comprising:
a computer;
a non-transitory computer-readable medium accessible by the computer; and
computer-readable instruction codes stored on the computer-readable medium and when executed by the computer implement a method comprising the steps of:
selecting a first shadow value and a second shadow value;
wherein the first shadow is an integer greater than 1 and the second shadow value is an integer greater than 2;
calculating a shadows' base value, by multiplying the first shadow value by the second shadow value then subtracting 1 from the shadows' base value to yield a first shadows' base value;
selecting an exponent value;
wherein the exponent value is a whole integer greater than 0;
raising the first shadows' base value, the first shadow value and the second shadow value to the exponent value to form a modified base value, a modified first shadow value and a modified second shadow value, respectively;
reading data to encipher, wherein that the data to encipher is in the form of an integer from 1 to the modified base value minus 1;
multiplying the the data with the modified first shadow value to obtain product value; and
obtaining a enciphered value of the data by taking a modulus between the product value and the modified based value.

4. The device of claim 3 wherein the computer-readable instruction codes when executed implement steps comprising:
multiplying the enciphered value and the modified second shadow value to create a product value; and
determining a deciphered value comprising a modulus between the product value and the modified base value.

5. The device of claim 3 wherein the computer-readable instruction codes are further operable to implement steps comprising:
producing a positive quotient value comprising a division using the first shadows' base value and any divisor value that it can be divided with to produce the value of 0 for a remainder; and
using the positive quotient value of said division as the first shadows' base value.

6. A method comprising the steps of:
selecting a first shadow value and a second shadow value;
wherein the first shadow is an integer greater than 1 and the second shadow value is an integer greater than 2;
calculating, by a computer, a shadows' base value, by multiplying the first shadow value by the second shadow value then subtracting 1 from the shadows' base value to yield a first shadows' base value;
reading data to encipher wherein the data to encipher is in the form of an integer from 1 to the base value minus 1;
multiplying, by the computer, the data with the first shadow value to obtain a product value;
obtaining an enciphered value of the data by taking a modulus of the product value with the first shadows' base value; and
sending the enciphered value to a user for deciphering and display of the deciphered value on a second computer, said second computer operated by the user.

7. A method comprising the steps of:
selecting a first shadow value and a second shadow value;
wherein the first shadow is an integer greater than 1 and the second shadow value is an integer greater than 2;
calculating, by a computer, a shadows' base value, by multiplying the first shadow value by the second shadow value then subtracting 1 from the shadows' base value to yield a first shadows' base value;
selecting an exponent value;
wherein the exponent value is a whole integer greater than 0;
raising the first shadows' base value, the first shadow value and the second shadow value to the exponent value to form a modified base value, a modified first shadow value and a modified second shadow value, respectively;
reading data to encipher, wherein that the data to encipher is in the form of
an integer from 1 to the base value minus 1;
multiplying, by the computer, the data with the modified first shadow value to obtain a product value;
obtaining an enciphered value of the data by taking a modulus operation of the product value and the modified base; and
sending the enciphered value to a user for deciphering and display of the deciphered value on a second computer, said second computer operated by the user.

* * * * *